Dec. 25, 1945. E. A. FUGLIE 2,391,405
METHOD OF REMOVING BROKEN STUDS
Filed Oct. 28, 1942 2 Sheets-Sheet 1

Inventor
ELMER A. FUGLIE
By P. M. Whiteley
Attorney

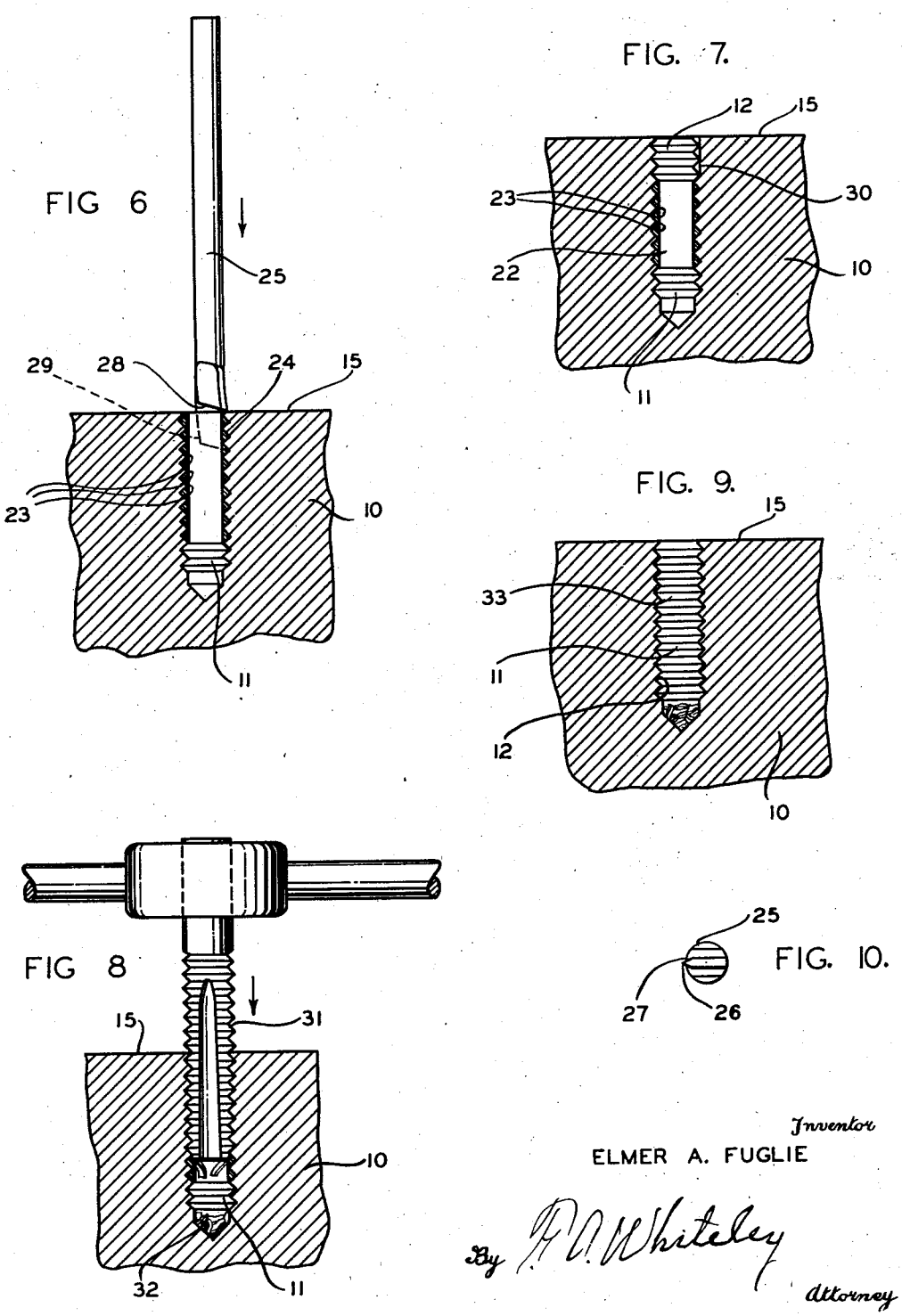

Patented Dec. 25, 1945

2,391,405

UNITED STATES PATENT OFFICE 2,391,405

METHOD OF REMOVING BROKEN STUDS

Elmer A. Fuglie, Winona, Minn., assignor to Winona Tool Mfg. Company, Winona, Minn., a corporation of Minnesota Application October 28, 1942, Serial No. 463,722

2 Claims. (Cl. 29—148)

My invention relates to a method of removing broken studs and has for its object to provide a series of steps for conveniently and efficiently removing broken studs while leaving the threaded stud hole in condition to receive a new stud bolt.

There are many appliances wherein one member is secured to another by means of stud bolts, the bolt extending through the member which is secured and being threaded at its end and screwed into a threaded hole in the member to which it is attached. A common example of very wide use of such a form of securing two members together is the cylinder head casing of gas engines, particularly automobile gas engines. Under such conditions, not infrequently the stud bolt will break, usually at the top of the hole, leaving the end of the bolt commonly referred to as a stud, threaded into the hole. Ordinarily there will be no part of the stud projecting outside of the hole to a sufficient extent to permit any kind of tool to be engaged with it to turn out the stud. The practice has been to use a drill directly upon the end of the stud of a size that would simultaneously take out the stud and the threads of the hole, then to retap the hole and employ a larger size stud bolt, which necessitated reboring the holes in the member to be secured, such as the cylinder head of automobile engines. This procedure has not been satisfactory, both because it involves a large amount of labor and because difficulties are encountered in drilling out the stud and the threads of the hole and reboring the holes through the attached part in getting these holes in perfect alinement. This is in part due to the fact that the two parts have been kept dissociated while the respective operations were performed upon them. Also it is difficult exactly to center the drill upon the broken end of the stud with the result that if centering is not accurate, the newly drilled hole may not line with the hole in the other member such as the cylinder head.

I have discovered that broken studs can be effectively removed by assembling the parts in fixed relation, introducing in the hole of the top part a sleeve having walls of a thickness equal to the depth of the threads of the internally threaded hole, and using a drill extending through said sleeve of the diameter of the inside of the hole. In this manner the core of the stud will be drilled out without injuring the threads of the stud hole, but leaving the stud threads still in the thread grooves of the stud hole; and following this, by chiseling through a short length across the interthreaded stud threads and stud hole threads and pulling out the cut stud threads for this section, then using a tap to force the stud threads from the stud hole thread grooves which are dropped to the bottom stud hole, the stud hole threads are cleared so a new stud bolt of identically the same size as was used before can be applied.

It is, therefore, the object of my invention to remove broken studs without at the same time drilling out the threads of the stud hole so that new stud bolts of identically the same dimensions may replace the broken stud bolt.

In this specification the respective parts will be referred to as the cylinder block and cylinder head of a gas engine, although it is to be understood that the invention is of a scope to remove broken studs where stud bolts are used in any relation to secure two parts together.

The full objects and advantages of my invention will appear in the specification hereinafter given in detail, and the novel features of the invention by which the above-noted advantageous results are obtained are particularly pointed out in the claims.

In the drawings illustrating the various steps of my invention and method:

Fig. 6 is a sectional view of the cylinder block through a hole therein, illustrating the step of chiseling through a limited number of threads at the top of the hole in the cylinder block to permit removal of enough stud threads to enable a tap to operate through the rest of the hole.

Fig. 7 is a sectional view similar to that of Fig. 6, showing removal of some of the top stud threads.

Fig. 8 is a sectional view of the cylinder block through a hole therein, showing the tapping out of the remainder of the stud threads.

Fig. 9 is a sectional view similar to Fig. 8, showing the threaded hole into the cylinder block freed of stud threads and ready to receive a new stud bolt.

Fig. 10 is an end view of the cutting tool shown in Fig. 6.

Figure 1:
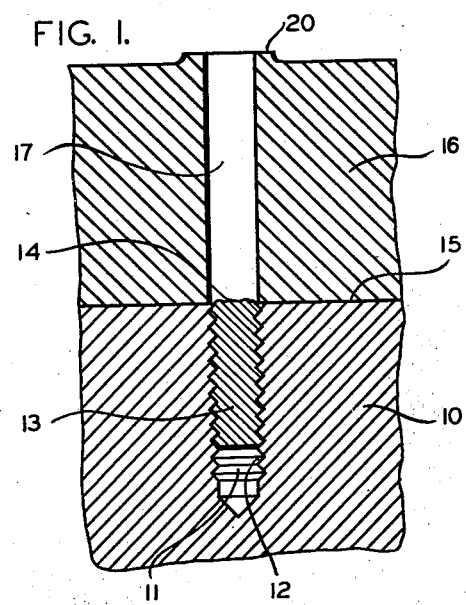
Fig. 1 is a sectional view taken through a portion of a cylinder block and cylinder head, and through the alined holes for securing them together by means of a stud bolt showing a broken stud in section.
Figure 2:
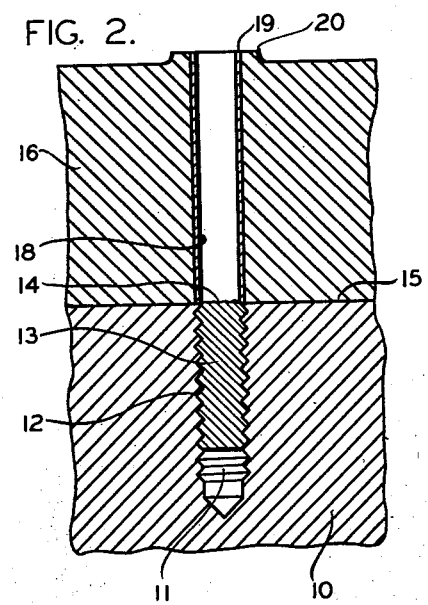
Fig. 2 is a view similar to Fig. 1, showing the first step of my process, namely, the positioning of a sleeve in the hole through the wall of the cylinder head, said sleeve having wall thicknesses equal to the depth of the threads of the stud and the stud hole.
Figure 3:
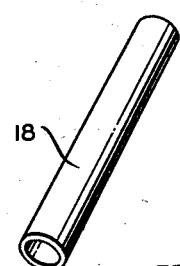
Fig. 3 is a perspective view of this sleeve.

Referring now to the drawings, a cylinder block 10 is formed with the customary stud bolt holes 11 internally threaded as indicated at 12. A broken stud shank 13 is shown in Figs. 1 and 2. The upper end 14 of said stud shank is shown, as is customarily true of broken stud bolts, as substantially in the plane of the top 15 of the cylinder block 10. The head block 16 is shown in Figs. 1, 2 and 3, as in position upon the cylinder block 10 with bolt hole 17 extending through it and in alinement with internally threaded hole 11 in the cylinder block 10. In this connection it will be noted that the bolt hole 17 has a transverse diameter, such that the walls thereof coincide with the bottoms of the threads 12 in stud bolt holes 11. A stud bolt, not shown, is therefore of a diameter substantially that of the stud bolt hole 17 and is threaded into the stud bolt hole 11 as is the broken stud end 13 shown in Figs. 1 and 2.

Figure 4:
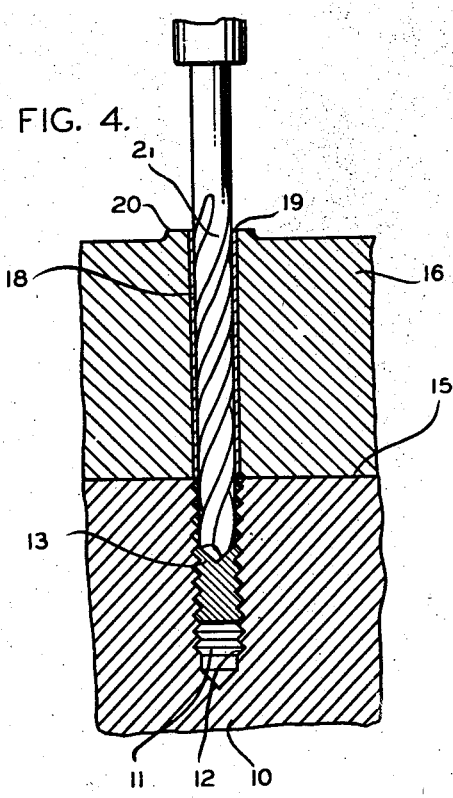
Fig. 4 illustrates the step of operating a drill through the sleeve, the drill having a cutting diameter the same as the internal diameter of the sleeve.

In the practice of my invention, while the head block 16 is secured upon the cylinder block 10 so that bolt hole 17 therethrough is centered about broken stud end 14, a sleeve 18 is introduced in bolt hole 17. As clearly indicated in Figs. 2 and 4, this sleeve has its circumferential wall of a thickness exactly equal to the depth of the threads 12 on the inside of stud bolt hole 11. That is, the cylinder outlined by the inner wall of sleeve 18 coincides with the cylinder outlined by the top of the threads 12. Sleeve 18 also is preferably of a length such that its upper edge 19 coincides with the top of the boss 20, customarily surrounding the top of bolt hole 17.

Figure 5:
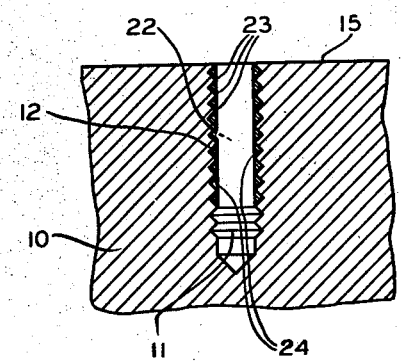
Fig. 5 is a sectional view showing the cylinder block after the head block has been removed with the stud threads in position in the thread grooves of the cylinder block.

As the next step in my method, a drill bit 21 is inserted within sleeve 18. The bit 21 has a diameter substantially that of the internal diameter of sleeve 18 which thus holds the bit perfectly centered upon the broken top 14 of stud end 13. It follows that operation of the drill will remove the body of the stud end 13, leaving a perfectly centered hole 22, which has its circumferential wall coinciding with the outer limits 23 of the threads 12 in bolt hole 11. There is left then, as shown in Fig. 5, only the bolt threads 24 which formed a part of the stud end 13.

These threads then must be removed to permit a new stud bolt to be screwed into the bolt hole 11. The next step in my process consists in the removal of these threads. This is accomplished, as shown in Fig. 6, by the use of a cutting tool 25. This tool, Fig. 10, is provided with a cutter portion 26 having a V-shaped cutter edge 27 disposed at a slight angle as indicated at 28 in Fig. 6. By the use of a hammer or mallet the cutter is driven downward as indicated in dotted lines at 29, Fig. 6, where it has forced its way through so as to cut across some four of five of the threads 24 remaining in the grooves of threads 12. After this cutting has been effected, the cut threads are pulled out by suitable appliances, leaving exposed a number of threads 12 as shown in Fig. 7. These threads 12 have been cut across as indicated at 30 in Fig. 7, but this does not interfere with their utility to permit a threaded member, as a bolt or a tap, to be screwed upon them.

In the final step of my process I employ a tap 31 of common construction of the same thread pitch and diameter as that of the internal threading of stud bolt hole 11. The remaining threads 24 are thus forced out of thread grooves 12 and fall into the space below the lowest extent of stud bolt 13, as indicated at 32, where they can be permitted to remain, or if it is deemed desirable to withdraw them that can be done readily by the use of a circular magnet put down into the bolt hole for that purpose. After the tapping operation the bolt hole 11 will have all its internal threads free and ready to have a stud bolt screwed upon them as indicated at 33 in Fig. 9.

The advantages of my invention will be apparent from the foregoing description. By the practice of my invention, broken stud bolt ends may easily be removed with absolute accuracy, leaving the internal threads of the bolt hole free and undamaged for receiving the threads of a new stud bolt. This is accomplished without expensive apparatus and has the very great merit of requiring a relatively small amount of labor and none of that highly skilled labor.

I claim:

1. The method of removing broken stud bolt ends, which consists in holding the member adapted to be fastened by the stud bolt with its bolt hole in normal position over the broken stud bolt end, applying in said hole a sleeve having an outer diameter substantially that of the hole and an inner diameter that of the cylinder outlined by the bottoms of the stud threads, guiding a drill bit of substantially the diameter of the inner diameter of the sleeve through said sleeve to center the bit upon the top of the broken end, operating the drill to remove the body portion of the stud end so as to leave the threads separated and in the threads of the stud bolt hole, and thereafter removing the separated threads to leave the bolt hole threads free end ready to receive a stud bolt.

2. The method of removing broken stud bolt ends, which consists in holding the member adapted to be fastened by the stud bolt with its bolt hole in normal position over the broken stud bolt end, applying in said hole a sleeve having an outer diameter substantially that of the hole and an inner diameter that of the cylinder outlined by the bottoms of the stud threads, guiding a drill bit of substantially the diameter of the inner diameter of the sleeve through said sleeve to center the bit upon the top of the broken end, operating the drill to remove the body portion of the stud end so as to leave the threads separated and in the threads of the stud bolt hole, cutting through a plurality of said separated threads from the top down, removing the cut threads to expose a section of upper bolt hole threads and thereafter applying a tap of suitable diameter and pitch to the exposed bolt hole threads and operating the tap to force out the remainder of the bolt threads to leave the bolt hole threads free and ready to receive a stud bolt.

ELMER A. FUGLIE.